US009641575B2

(12) United States Patent
Le Huerou et al.

(10) Patent No.: US 9,641,575 B2
(45) Date of Patent: May 2, 2017

(54) METHOD FOR SHARING MULTIMEDIA CONTENT BETWEEN TWO USERS (71) Applicant: Orange, Paris (FR)

(72) Inventors: Emmanuel Le Huerou, Saint Quay Perros (FR); Jean-Pierre Godest, Lannion (FR)

(73) Assignee: ORANGE, Paris (FR)

( * ) Notice: Subject to any disclaimer, the term of this patent is extended or adjusted under 35 U.S.C. 154(b) by 209 days.

(21) Appl. No.: 14/368,205

(22) PCT Filed: Dec. 17, 2012

(86) PCT No.: PCT/FR2012/052952
§ 371 (c)(1),
(2) Date: Jun. 23, 2014

(87) PCT Pub. No.: WO2013/093313
PCT Pub. Date: Jun. 27, 2013

(65) Prior Publication Data
US 2014/0351335 A1  Nov. 27, 2014

(30) Foreign Application Priority Data
Dec. 23, 2011  (FR) .................................... 11 62429

(51) Int. Cl.
*G06F 15/16* (2006.01)
*H04L 29/06* (2006.01)
*H04L 29/08* (2006.01)

(52) U.S. Cl.
CPC ........ *H04L 65/403* (2013.01); *H04L 65/1069* (2013.01); *H04L 67/02* (2013.01);
(Continued)

(58) Field of Classification Search
None
See application file for complete search history.

(56) References Cited

U.S. PATENT DOCUMENTS

2007/0271338 A1  11/2007  Anschutz
2007/0296805 A1  12/2007  Tedenvall et al.
(Continued)

OTHER PUBLICATIONS

International Preliminary Report on Patentability dated Jul. 8, 2014 for corresponding International Application No. PCT/FR2012/052952, filed Dec. 17, 2012.
(Continued)

*Primary Examiner* — John B Walsh
(74) *Attorney, Agent, or Firm* — David D. Brush; Westman, Champlin & Koehler, P.A.

(57) ABSTRACT

A method for sharing multimedia content between at least a first user and a second user using first and second telecommunications terminals, respectively, the content being associated with the second user and being stored in a database hosted by a service platform accessible via a telecommunications network. The method includes: a network-based content-sharing server validating a request to share multimedia content transmitted by the first terminal by authenticating an identifier of the second terminal, which was obtained from a response to the request received from the second terminal; in the content-sharing server, if the sharing request is validated, activating a sharing session and opening a sharing memory space for enabling the sharing of content data between the first and second terminal, and transmitting session activation information to the first terminal; and displaying, in each of the first and second terminals, a sharing window for displaying the data of the sharing space during the sharing session.

15 Claims, 2 Drawing Sheets

(52) U.S. Cl.
CPC .............. *H04L 67/10* (2013.01); *H04L 67/14* (2013.01); *H04L 63/10* (2013.01)

(56) References Cited

U.S. PATENT DOCUMENTS

| | | | |
|---|---|---|---|
| 2009/0100134 A1 | 4/2009 | Svennarp | |
| 2009/0157627 A1* | 6/2009 | Arthursson | G06F 9/45504 |
| 2010/0226346 A1* | 9/2010 | Caldwell | H04M 15/00 |
| | | | 370/338 |
| 2011/0173547 A1 | 7/2011 | Lewis et al. | |
| 2014/0020059 A1* | 1/2014 | Miyamoto | G06F 12/00 |
| | | | 726/2 |

OTHER PUBLICATIONS

International Search Report and Written Opinion dated Jan. 23, 2013 for corresponding International Application No. PCT/FR2012/052952, filed Dec. 17, 2012.

* cited by examiner

METHOD FOR SHARING MULTIMEDIA CONTENT BETWEEN TWO USERS

CROSS-REFERENCE TO RELATED APPLICATIONS

This Application is a Section 371 National Stage Application of International Application No. PCT/FR2012/052952, filed Dec. 17, 2014, which is incorporated by reference in its entirety and published as WO 2013/093313 on Jun. 27, 2013, not in English.

FIELD OF THE DISCLOSURE

The invention relates generally to the field of telecommunications and more specifically to the sharing of data stored in a telecommunications network between two user terminals connected to the network.

BACKGROUND OF THE DISCLOSURE

The present invention applies in particular to a telecommunications system coming under the concept known as "cloud computing", i.e. a computer system which enables private individuals to store their personal data on servers, but which also enables companies that do not have their own servers to store their data on servers that they rent; these companies thus delegate their computation and storage operations to providers that have information technology infrastructure spread worldwide and interconnected by a network. Access to this "cloud computing" setup is generally via the Internet, and in this context a private user or a company employee accesses his/he applications and his/her data hosted on one or several remote servers through a "virtual office" via any computer terminal connected to the network.

Thus, conventionally, the user of a data storage service on the Internet logs on to a service platform in which a digital database is hosted containing personal data, typically documents or multimedia content such as photos, videos, audio documents etc., via a web browser on the user's computer terminal. More specifically, in order to log on to his/her personal space on the network, the user enters a user identifier (or login name) and a password from his/her terminal connected to an IP (Internet Protocol) network. After the server has verified the user's identity, the user accesses his/her personal data environment. The user can thus log on to his/her personal data environment hosted by the service platform from various computer terminals connected to the Internet in a fixed manner (a PC, for example) or on the move (a smartphone, tablet computer, etc.).

By way of examples, such "cloud" computing data storage services are proposed by companies such as Dropbox (Dropbox™, online file sharing and storage) or Google (Picasa Web Album™, management of photos on the web).

Such service platforms also offer multimedia content sharing features which in particular enable a user of the service platform to deliver presentations of content to another user. Conventionally, to establish a session for presenting or sharing content, the presenting user and the "visiting" user must both be registered with the service platform, i.e. both must have their own user identities. Moreover, in the majority of the known content sharing solutions, a specific software application must be installed in the computer terminal of the presenting user, but also in that of the visiting user.

SUMMARY

According to a first aspect, the present invention relates to a method for sharing multimedia content between at least a first user and a second user using a first and a second telecommunications terminal respectively, the multimedia content being associated with the second user and being stored in a database hosted by a service platform accessible via a telecommunications network. In accordance with the invention, this method comprises the steps of:

(A)—a content sharing server on the network validating a multimedia content sharing request transmitted by the first terminal, by authenticating an identifier of the second terminal obtained from a response to the request received from the second terminal;

(B)—in the content sharing server, if the sharing request is validated, activating a sharing session and opening a sharing memory space intended to enable the sharing of content data between the first and the second terminals, and transmitting session activation information to the first terminal;

(C)—displaying in each of the first and second terminals a sharing window intended to display data of the sharing space during the sharing session.

According to the method of the invention, defined above in general terms, access by the first terminal to the service platform in order to share digital documents with the user of the second terminal is conditional upon the successful authentication of an identifier of the second terminal by the content sharing server. Thus, it is not necessary for the user of the first terminal to be a user registered with the platform providing the content sharing service.

Moreover, access by the first user (the user of the first terminal) to the personal data of the second user is secure since validation by the sharing server of the sharing request sent by the first terminal takes into account an identifier of the terminal of the second user in a message of response to the request, which message is received from the second terminal. For example, when the second terminal is a cellular telephony terminal (for example a smartphone), the aforementioned identifier of the second terminal is a cellular telephony network subscriber identifier, for example a phone number (MSISDN number) stored in the SIM card of the phone.

In practice, when the second terminal is a cell phone (for example a smartphone), the user of the second terminal who owns the personal data stored on the network can as a result quickly and simply, using his/her cell phone, authorize another terminal for the access and sharing of his/her personal data. Specifically, the MSISDN number (Mobile Station ISDN number) stored in the SIM (Subscriber Identity Module) card of the cell phone can be deduced from the response to the sharing request, and then is authenticated in the server, thereby providing for reliably ensuring the origin of the response to the sharing request.

According to a feature of the invention, the abovementioned method further comprises a step (D) of the second user determining at least one multimedia content item to share, and the second terminal transmitting to the sharing server at least one command intended to enable the determined multimedia content to be displayed in the first terminal via the sharing window.

By virtue of the aforementioned feature, it is the second user who controls the running of the session for sharing the selected content, using his/her terminal (the second terminal) as if it were a "remote control" for controlling the session and the display of the shared content in the first terminal.

According to a particular embodiment, at the abovementioned step (D), the command intended to enable the display of determined multimedia content is a command using an XML language and transmitted according to an HTTP protocol, the processing of the command by the content sharing server triggering the creation of a URL (Uniform Resource Locator) link in the sharing space, enabling access to the multimedia content from the first terminal.

In practice, the first terminal executes a preliminary operation of downloading and displaying a webpage for accessing the sharing server of the service platform. Next, to display content selected by the second user, the first user can, according to a first example, click using a mouse on a hypertext link (URL) displayed in the sharing window produced by the Internet browser of the first terminal; according to a second example, the hypertext link can be resolved automatically and the content displayed without intervention by the user, for example in slideshow mode in the case of photos.

According to a first embodiment of the invention, the step (A) of the method above includes:

(a1)—in the first telecommunications terminal, generation of a request to share the content, this request including identification information for the second user, and sending of the sharing request to the sharing server;

(a2)—in the sharing server, determination of the second telecommunications terminal from the identification information for the second user, which information is extracted from the received sharing request, and then transmission to the second terminal of a sharing authorization request concerning the first terminal in relation to the multimedia content to be shared;

(a3)—in the second terminal, the sending of a response to the sharing authorization request to the sharing server of the platform.

In this embodiment, the step (a3) comprises, according to an example embodiment, the notifying of the sharing authorization request in the second terminal; and following an action by the second user carried out by means of a man-machine interface on the second terminal, the sending of a response to the sharing authorization request to the sharing server.

Thus, in this first embodiment, it is the sharing server which serves as intermediary between the user of the first terminal and the user of the second terminal who owns the data which the first user wishes to access. This embodiment is thus particularly suitable for the scenario in which the first and second users are remote from one another.

In practice, the sharing method according to the invention comprises a preliminary operation of downloading and displaying in the first terminal a webpage for accessing the sharing server of the platform. According to a second embodiment, which can advantageously be combined with the first embodiment described above, the sharing server access webpage displayed in the first terminal represents a two-dimensional code generated automatically by the sharing server when the aforementioned webpage is downloaded. In this context, the step (A) of the method according to the invention is preceded by the following steps:

transmission of information representing a sharing request from the first terminal to the second terminal, consisting in transmitting the two-dimensional code to a software application installed in the second terminal;

in the second terminal, the sending of a response to the sharing request to the sharing server.

In this second embodiment, the sharing request is transmitted directly from the first terminal to the second terminal, for example by the second terminal photographing the code displayed on the screen of the first terminal. It will be understood that this embodiment is particularly suited to the scenario in which the two terminals are located close to one another, for example in the same room. In this context, the implementation of the invention can be used to produce a multimedia content presentation application, for example in a training context, conducted by the user of the second terminal, for example a smartphone, having the attention of several "first" users having personal computer (PC) terminals.

According to a particular feature of the invention, the sharing method comprises the display in the second terminal of a user interface presenting to the user of the second terminal information relating to the sharing requests and to the states of the active sharing sessions with the service platform for a predetermined group of telecommunications terminals; this user interface offering functions for controlling a sharing session in progress, relating in particular to the duration of the session or to stopping the session.

Thus, the user of a terminal (second terminal) according to the invention, "owner" of the documents that can form the subject of a shared consultation, will advantageously be able to maintain control of the active connections with the content server for a predefined group of user terminals. In particular, the user of the second terminal will have, via a graphical interface, the option to interrupt an active connection between a first terminal among the group of predefined terminals and the content server.

According to a second aspect, a subject of the present invention is a telecommunications terminal comprising:

means for receiving information representing a multimedia content sharing request transmitted by a first telecommunications terminal, the multimedia content being stored in a database hosted by a service platform on a telecommunications network;

means for generating and sending a response to the content sharing request to a content sharing server of the platform in order to enable the validation of the sharing request by authenticating an identifier of the telecommunications terminal;

means for controlling a sharing session including means for determining at least one multimedia content item to share, and means for transmitting to the sharing server at least one command intended to enable the display of the determined multimedia content in the first terminal.

According to particular features of the telecommunications terminal according to the invention, the telecommunications terminal includes:

graphical interface means suitable for displaying information relating to the multimedia content sharing requests and to the activation states of content sharing sessions for a predetermined group of telecommunications terminals;

means for receiving and reading a two-dimensional code transmitted by the first terminal, this code being representative of a multimedia content sharing request by the first terminal, and the response to the content sharing request sent to the content sharing server including the two-dimensional code.

Such a code transmitted initially by the server to the first terminal can include an identifier of the first terminal and a secret code. The preliminary exchange of a secret code between the sharing server and the first terminal thus provides for further securing the sharing method according to the invention. The abovementioned two-dimensional code is retrieved by the second terminal in accordance with the second embodiment described earlier, and then transmitted with the response to the sharing request, from the second terminal to the sharing server. The sharing server can then advantageously perform a double verification, i.e. verify the identity of the user of the second terminal, for example from the phone number associated with the second terminal, and compare the aforementioned received two-dimensional code with the one initially transmitted to the first terminal.

Correspondingly, according to a third aspect, the present invention relates to a multimedia content sharing server for implementing a content sharing method, as briefly described earlier, this server comprising:

means for receiving, from a second telecommunications terminal, a response to a multimedia content sharing request transmitted by a first telecommunications terminal;

means for verifying an identifier of the second terminal following the reception of the response to a content sharing request;

means for activating a content sharing session between the first and the second terminal depending on the result of the verification of the identifier of the second terminal.

According to particular features of such a sharing server according to the invention, the abovementioned reception means are suitable for receiving a content sharing request from the first terminal, this request including identification information for a second user. Moreover, the sharing server further includes:

means for determining the second telecommunications terminal from the identification information for a second user, which information is extracted from the received content sharing request; and, means for transmitting to the second terminal a sharing authorization request concerning the first terminal in relation to said multimedia content;

the sharing session activation means include means for creating a sharing memory space intended to enable the temporary sharing of content data between the first and second terminals.

Lastly, according to a last aspect, a subject of the invention is a software module intended to be incorporated in a telecommunications terminal according to the invention, as briefly described earlier, or intended to be incorporated in a sharing server according to the invention, as briefly described earlier. Such a software module includes program instructions, the execution of which by a computer processor provides for implementing the steps of a multimedia content sharing method, according to the invention, which, depending on the case considered, are executed in a telecommunications terminal according to the invention or in a sharing server according to the invention.

Moreover, such a software module can use any programming language and can comprise programs in the form of source code, object code or a code intermediate between source code and object code, such as in a partially compiled form or in any other desirable form.

Consequently, another aim of the invention is an information recording medium readable by a computer and including computer program instructions. Such a recording medium can be formed by any entity or device capable of storing such a program. For example, the medium can include a means of storage such as a ROM, for example a CD-ROM or a microelectronic circuit ROM, or a removable recording means such as a USB flash drive, or a magnetic recording means such as a hard disk. On the other hand, a software module according to the invention can in particular be downloaded over an Internet type network.

The advantages provided by a telecommunications terminal, a sharing server and a software module, such as those briefly defined earlier, are identical to or contribute to the advantages mentioned earlier in relation to the sharing method according to the invention, and therefore will not be reviewed here.

BRIEF DESCRIPTION OF THE DRAWINGS

Other features and advantages of the present invention will emerge from the following detailed description which makes reference to the accompanying drawings in which.

DETAILED DESCRIPTION OF ILLUSTRATIVE EMBODIMENTS

Figure 1:
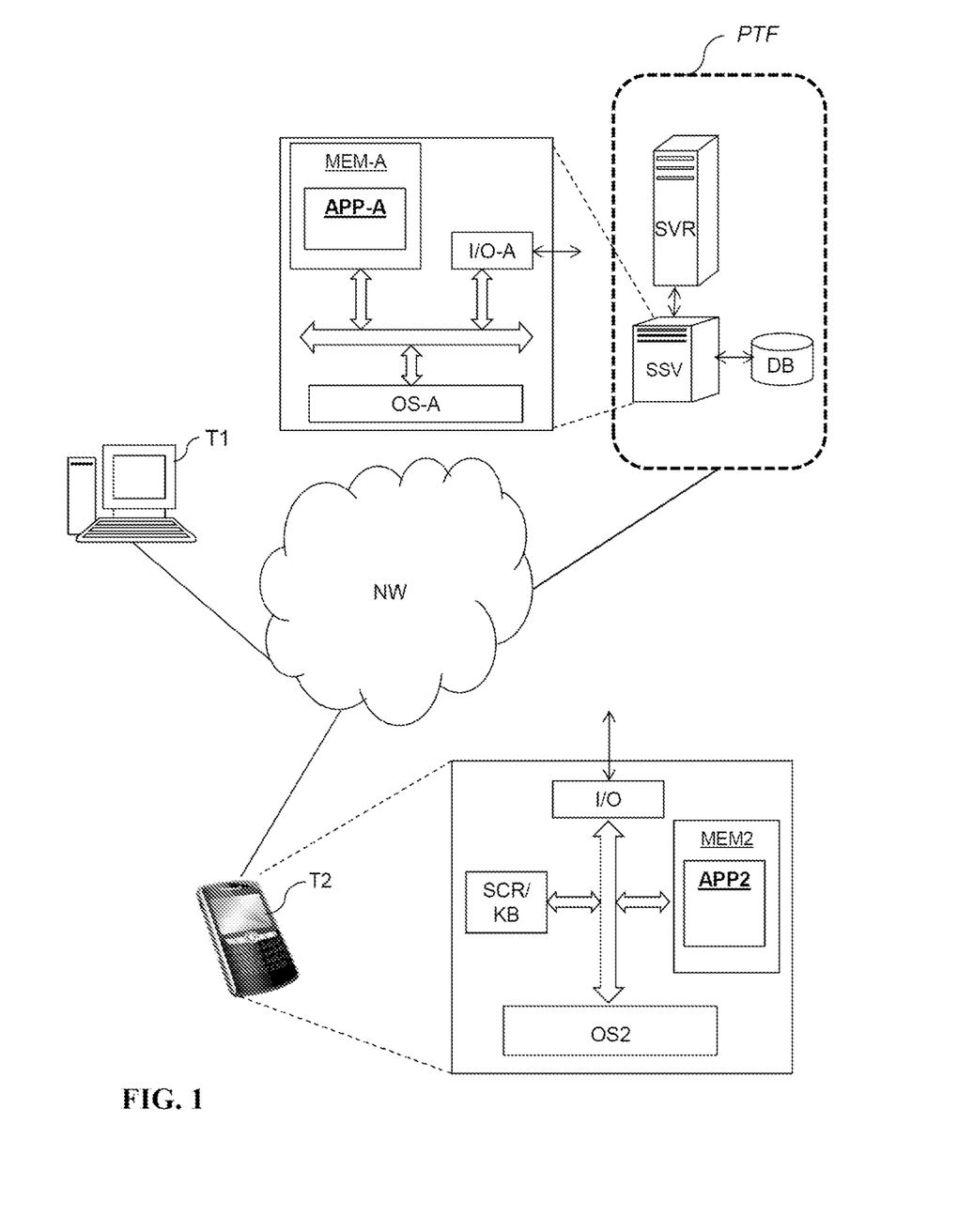
FIG. 1 illustrates a telecommunications system in which the invention is implemented, and in particular illustrates the functional elements incorporated in a telecommunications terminal and in a sharing server respectively, according to the invention.

FIG. 1 illustrates a telecommunications system in which the invention is implemented. As represented in FIG. 1, a first telecommunications terminal T1 is connected to the telecommunications network NW formed here by an IP Internet network. The terminal T1 in this example embodiment is a personal computer (PC), but it can be a tablet computer, a smartphone connected to the Internet or a connected television (TV) type terminal.

The system also comprises a service platform PTF connected to the network NW, and which offers various services such as personal data storage "in the cloud" (cloud storage), for example the storage of multimedia documents such as videos, photos, textual material, etc. The service platform PTF comprises a document (or content) sharing server SSV associated with a database DB of users of the services of the platform, and a data server SVR storing the personal data of users registered with the personal data storage service, i.e. having personal data stored by the data server SVR.

The user database (DB) associated with the sharing server (SSV) contains, for each user of the service platform, a list or a stored table containing an identifier of the user or subscriber to the data sharing and storage service, for example a username, associated with at least a telephony network subscriber identifier or a terminal identifier, for example a cell phone number, a fixed IP phone number or an IP address. Furthermore, such a user table can advantageously include another communication identifier, such as an email address. Thus, the user of a terminal T1 may use an email address, for example, to enable the server to identify a user registered in the user database (DB) and then determine a terminal (T2) associated with the identified user.

The system represented also includes a second telecommunications terminal, T2, connected to the network NW. In the example embodiment described and illustrated, the terminal T2 is a cellular telephony terminal of the smartphone type. The cell phone T2 is represented in FIG. 1 connected to the network NW in order to simplify the description. However, the terminal T2 can in practice be connected to the network NW via an access network, for example a Wi-Fi network, or via a third generation cellular network (UMTS) (data mode connection).

As represented in FIG. 1, the cell phone T2 notably includes the following functional modules:

An input/output communication module, denoted by "I/O" and intended to communicate with the network NW.

An operating system module, OS2, for example the Android™ operating system of the company Google, managing the interaction between the various modules and the processor (not represented) of the terminal T2.

A display device associated with a keypad (tactile or mechanical) "SCR/KB".

A memory module MEM2 in which there is stored an application or software module APP2 according to the invention. It will be noted here that an Internet browser can constitute the application APP2.

The I/O module provides in particular for receiving information representing a request by the first telecommunications terminal T1 to share multimedia content belonging to the personal data of the user of the terminal T2, which data is stored by the data server SVR of the service platform PTF, and then for communicating this information to the application APP2.

The application APP2 includes program instructions suitable for generating a response to the aforementioned sharing request, which is then transmitted to the I/O module which in turn transmits it to the sharing server SSV via the network NW.

The application APP2 of the terminal T2 also includes instructions, the execution of which produces a man-machine interface—in practice a graphical interface displayed by the screen SCR of the terminal—through which the user of the terminal T2 receives notification of information representing the document sharing request, and enables the user to send a response to the sharing request to the sharing server (SSV).

In the embodiment presented, the graphical interface produced by the application APP2 is suitable for displaying information relating to document sharing requests and to the states of connection with the service platform PTF for a predetermined group of telecommunications terminals. This group of terminals can include other terminals of the main user of the terminal T2 (a cellular terminal in the embodiment illustrated), such as for example a tablet computer or a home PC, or telecommunications terminals belonging to persons chosen by the user of the terminal T2 (for example friends or family members).

According to a particular embodiment, the terminal T2 also comprises a module for reading a two-dimensional code integrated or associated with the application APP2, and notably providing for reading a two-dimensional code displayed by the first terminal T1, which code representing a request to share a document by the terminal T1.

In this embodiment, a response to a document sharing request transmitted by the terminal T2 to the sharing server includes such a two-dimensional code, which the content sharing server then compares with the code generated initially. In practice, such a two-dimensional code can be formed by a barcode, such as a QR code.

According to a variant embodiment, a terminal T2 according to the invention can be equipped with an NFC tag reader intended to read an NFC (Near Field Communication) tag equipping and programmed by the terminal T1.

Still referring to FIG. 1, the content sharing server, SSV, correspondingly includes the following functional modules:

An input/output communication module, denoted by "I/O-A" and intended to communicate with the network NW and notably to receive a content sharing request from the first terminal T1, this content sharing request including identification information for a user registered with the services provided by the service platform PTF. In the embodiment described, this user identification information is identification information for a subscriber to a second telecommunications network, in this case a cellular telephony network, the identification information being, for example, the phone number associated with the SIM card incorporated in the terminal T2. The module I/O-A is also responsible for transmitting to the second terminal T2, identified from the aforementioned identification information, a content sharing authorization request for the first terminal T1.

An operating system module, OS-A, managing the interaction between the various modules and the processor (not represented) of the server.

A memory module MEM-A in which there is stored an application or software module APP-A according to the invention, the program instructions of which, when they are executed by a processor (not represented) of the sharing server SSV, provide for implementing the steps of the content sharing method according to the invention which are implemented in the content sharing server. In particular, the software module APP-A is designed to verify an identifier of a second terminal T2 (i.e. in the embodiment described, a subscriber identifier (phone number) for a cellular telephony network) following the reception of a response to a content sharing request from the terminal T2. Otherwise, the module APP-A is responsible for validating, or not, the content sharing request transmitted by the first terminal T1 depending on the result of the aforementioned verification.

Figure 2:
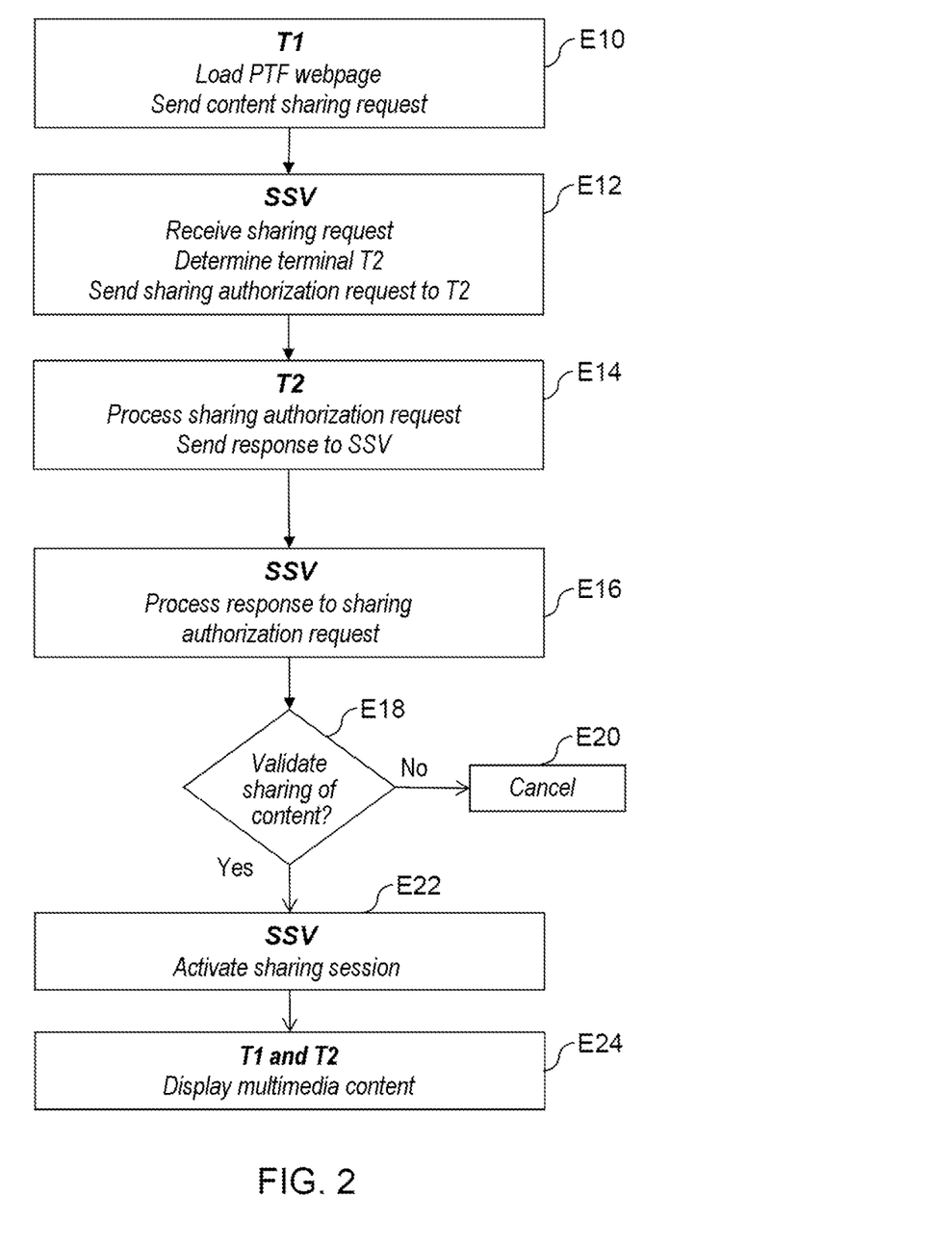
FIG. 2 represents in flow-chart form the main steps of a sharing method, according to the invention, for sharing multimedia content stored in a service platform between a first and a second telecommunications terminal.

FIG. 2 represents in flow-chart form the main steps of the method for sharing a multimedia content item between a first and a second telecommunications terminal, according to the invention.

As represented in FIG. 2, the method according to the invention begins with step E10 during which the terminal T1 connected to the Internet has loaded a webpage for accessing the document sharing server (SSV) of the service platform, for example an address of the type "cloudphone.orange.fr". The user of the terminal T1 is aware of at least one communication identifier for identifying the owner of the content which they wish to consult, for example a photo album. This communication identifier can be an email address, a landline number, a cell phone number or the name of the person.

The user of the terminal T1 enters this identifier in a dedicated field on the webpage displayed on the terminal screen. Assuming that this identifier is an email address, a content sharing request is then generated, and this request includes the identification information formed by the email address of the owner of the data. The sharing request is then sent to the sharing server SSV.

At the next step E12, the sharing server receives the sharing request from the terminal T1, extracts the identification information of a person, in this example an email address, and consults the user database DB with this email address as input parameter, in order to obtain at least one item of information for connecting with the user who owns the content that is the subject of the request, for example a communications network subscriber identifier. In this example, the sharing server SSV obtains a cell phone number. The server SSV then transmits to the cellular terminal T2, which corresponds to the cell phone number obtained, a sharing authorization request representing the sharing request of the first terminal T1 relating to an item of personal content of the person identified by the aforementioned phone number, from the user database DB of the service platform PTF. In the embodiment described, the sharing authorization request includes a sharing session identifier generated in the sharing server, associated with an item of information relating to the identity of the user of the terminal T1.

At the next step, E14, in the cellular terminal T2, the sharing authorization request is received by the application APP2 and notified to the user of the terminal, for example by a specific ring tone. According to variant embodiments, the terminal T2 can be notified of the sharing authorization request by the sending of an SMS or MMS message, or by a telephone call triggered automatically by an interactive voice server controlled by the sharing server. Once the sharing authorization request is notified to the user of the second terminal, that user can then trigger, via the graphical interface displayed by the application APP2 of the terminal T2, the sending of a response to the sharing authorization request, to the sharing server SSV.

As described earlier in the description, according to one advantageous embodiment of the invention, the owner of the data to be shared and user of the terminal T2 has the option of predefining a list of terminals T1—which is stored in the terminal T2 or accessible over the network through the application APP2 of the terminal T2—for which terminals a favorable response to the received sharing request is automatically sent by the second terminal to the sharing server. According to a variant embodiment which can be combined with the previous embodiment, such a predefined list of terminals can be stored in the sharing server, in which case the step for transmitting a sharing authorization request to the terminal T2 is not implemented for the terminals identified in the aforementioned list.

In the second embodiment presented earlier in the description, in the terminal T1, the webpage for accessing the sharing server of the service platform brings about the display of a two-dimensional code generated automatically by the sharing server when the webpage is being downloaded. Step E12 of FIG. 2 is consequently "bypassed" since the two-dimensional code is transmitted directly from the first terminal T1 to the second terminal T2, for example by the terminal T2 photographing the code. In this case, the response to the sharing authorization request, generated by the terminal T2, at step E14, includes the photographed code.

At step E16, when the sharing server SSV receives a response to the sharing authorization request from the terminal T2, it analyses the response and validates, or not, the request transmitted by the first terminal, for sharing the content considered, depending on the content of the response. If the response received from the terminal T2 is negative (E18, No), the sharing session is canceled and the sharing server SSV transmits a sharing session refusal indication to the terminal T1 (step E20).

If the response received from the terminal T2 is positive (E18, Yes), at step E22, the sharing server activates the sharing session and the terminal T2 is informed of the activation of the session. To this end, the sharing server opens a sharing memory space intended to receive data for displaying, in the terminal T1, a multimedia document or content chosen by the user of the terminal T2 or requested by the user of the terminal T1 during the opened sharing session. Furthermore, following the opening of the aforementioned sharing space, the sharing server brings about the display of a sharing window in each of the terminals T1 and T2—via the application APP2 in the terminal T2, and, in the terminal T1, via the web browser of the terminal T1.

Once a sharing window is opened in each of the terminals T1 and T2 respectively, the user of the terminal T2, by means of a predefined command of the user interface provided by the application APP2, causes the terminal T2 to switch to a control mode for the sharing session. In this sharing session control mode, the user of the terminal T2 has the option to interrupt an active sharing session at any time, or to configure the duration of the session. The user of the terminal T2, via the application APP2, can also give particular rights about a content item to a participant in a session such as the user of the terminal T1, for example read rights, write rights, etc.

In parallel with the active session, the users T1 and T2 can be in communication, via another communication channel, for example a telephone communication, or instant messaging, and through this means they can agree on the content to be shared.

At step E24, during the sharing session the user of the terminal T2 can then determine a multimedia content item to be shared or presented, for example a photo album. With this aim, the user of the terminal T2 can then select a particular element of the multimedia content intended to be presented, for example a photo, via the graphical user interface of the application APP2. For each element selected, the application APP2 transmits a command to the application APP-A of the sharing server, this command creating in the sharing memory space a URL link pointing to the actual memory position corresponding to the element in question. In practice, according to an example embodiment, this URL link is a single-use link, i.e. it will be destroyed once the element is transmitted to the terminal T1.

The link to the content to be displayed is then transmitted by the application APP-A of the server SSV to the web client (web browser) of the terminal T1. In the embodiment described, any update to the data contained in the sharing memory space, in the server SSV, is immediately passed on to the web client of the terminal T1. In practice, the transmission is carried out according to the "push" communication mode of the HTTP protocol, and the automatic update search by a "long polling" technique implemented by the web client of the terminal T1.

As soon as a URL link (or, more generally, a hypertext link) to an element to be shared is received, the web browser of the terminal T1 downloads the corresponding element stored in the data server SVR.

Generally, in the embodiment described here, the exchanges between the terminals T1 and T2 and the sharing server SSV are implemented by commands using the known language XML (Extensible Markup Language) and transmitted according to the known communication protocol HTTP (HyperText Transfer Protocol).

By virtue of the invention, the user of a telecommunications terminal T1 of a standard type (PC, smartphone, tablet computer, connected TV, etc), without being registered with the data sharing and storage service provided by the service platform PTF, and without prior installation of a specific application in his/her terminal, may access and share data with a user registered with the services of the platform, who may, via his/her terminal (T2) connected to the network, remotely control a data sharing session in a cloud computing system.

An exemplary embodiment of the present invention aims to improve the situation described above in the background section notably by enabling a user of a data storage service on a telecommunications network to securely establish a session for sharing his/her data with any person having a computer terminal that can be connected to the network without it being necessary for this person to be a registered user of the service in question.

Although the present disclosure has been described with reference to one or more examples, workers skilled in the art will recognize that changes may be made in form and detail without departing from the scope of the disclosure and/or the appended claims.

The invention claimed is:

1. A method for sharing multimedia content between at least a first user and a second user using a first and a second telecommunications terminal respectively, the multimedia content being associated with the second user and being stored in a database hosted by a service platform accessible via a telecommunications network, wherein the method comprises the following acts:
   (A)—a content sharing server on said network validating a multimedia content sharing request transmitted by the first terminal, by authenticating an identifier of said second terminal obtained from a response to said request, received from the second terminal;
   (B)—in the content sharing server, if the sharing request is validated, activating a sharing session and opening a sharing memory space intended to enable the sharing of content data between the first and the second terminals, and transmitting session activation information to the first terminal;
   (C)—displaying in each of the first and second terminals a sharing window intended to display content data in the sharing space during this sharing session.

2. The method as claimed in claim 1, further comprising:
   (D)—the second user determining at least one multimedia content item to share, and the second terminal transmitting to the sharing server at least one command intended to enable the determined multimedia content to be displayed in the first terminal via said sharing window.

3. The method as claimed in claim 1, in which the act (A) includes:
   (a1)—in the first telecommunications terminal, generation of a request to share said content, said request including identification information for said second user, and sending of the sharing request to the sharing server;
   (a2)—in the sharing server, determination of the second telecommunications terminal from said identification information for the second user, which information is extracted from the received sharing request, and then transmission to the second terminal of a sharing authorization request concerning the first terminal in relation to said multimedia content;
   (a3)—in the second terminal, sending a response to said sharing authorization request to the sharing server of said platform.

4. The method as claimed in claim 3, in which the act (a3) comprises notifying the sharing authorization request in the second terminal; and following an action by the second user carried out by a man-machine interface on the second terminal, sending a response to the sharing authorization request to the sharing server.

5. The method as claimed in claim 1, comprising a preliminary operation of downloading and displaying in the first terminal a webpage for accessing the sharing server of said platform, and in which said sharing server access webpage displayed on a screen of the first terminal represents a two-dimensional code generated automatically by the sharing server when said webpage is downloaded; and in which the act (A) is preceded by the following acts:
   transmission of information representing a sharing request from the first terminal to the second terminal, including transmitting said two-dimensional code to a software application installed in the second terminal;
   in the second terminal, sending a response to said sharing request to the sharing server.

6. The method as claimed in claim 2, comprising displaying in the second terminal a user interface presenting to the user of the second terminal information relating to the sharing requests and to the states of the active sharing sessions with the service platform for a predetermined group of telecommunications terminals, said user interface offering functions for controlling a sharing session in progress, relating in particular to the duration of the session or to stopping the session.

7. The method as claimed in claim 2, in which at the act (D), said command intended to enable the display of determined multimedia content is a command using an XML language and transmitted according to an HTTP protocol, wherein processing of said command by the content sharing server triggers creation of a URL link in the sharing space, enabling access to the multimedia content from the first terminal.

8. The method as claimed in claim 1, in which the second terminal is a cellular telephony terminal and said identifier of the second terminal is a cellular telephony network subscriber identifier.

9. A telecommunications terminal comprising a processor and a software module including program instructions, the execution of which by the processor causing the telecommunications terminal to:
   receive information representing a multimedia content sharing request transmitted by a first telecommunications terminal, said multimedia content being stored in a database hosted by a service platform on a telecommunications network;
   generate and send a response to said content sharing request to a content sharing server of said platform in order to enable validation of the sharing request by authenticating an identifier of said telecommunications terminal;
   control a sharing session including means for determining at least one multimedia content item to share, and transmit to the sharing server at least one command configured to enable display of the determined multimedia content in the first terminal.

10. The terminal as claimed in claim 9, including a screen, which provides a graphical interface suitable for displaying information relating to the multimedia content sharing requests and to activation states of content sharing sessions for a predetermined group of telecommunications terminals.

11. The terminal as claimed in claim 9, wherein the software module further includes program instructions, the execution of which by the processor causing the terminal to receive and read a two-dimensional code transmitted by the first terminal, said code being representative of a multimedia content sharing request by the first terminal, said response to said content sharing request sent to the content sharing server including the two-dimensional code.

12. A multimedia content sharing server comprising a processor and a software module including program instructions, the execution of which by the processor causing said server to:

receive, from a second telecommunications terminal, a response to a multimedia content sharing request transmitted by a first telecommunications terminal;

verify an identifier of the second terminal following the reception of said response to a content sharing request; and activate a content sharing session between the first and the second terminal depending on the result of the verification of the identifier of the second terminal.

13. The server as claimed in claim 12, wherein the software module further includes program instructions, the execution of which by the processor causes the server to:

receive a content sharing request from the first terminal, said request including identification information for a second user;

determine the second telecommunications terminal from said identification information for a second user, which information is extracted from the received content sharing request; and, transmit to the second terminal a sharing authorization request concerning the first terminal in relation to said multimedia content.

14. The server as claimed in claim 12, in which said sharing session activation includes creating a sharing memory space intended to enable the temporary sharing of content data between the first and second terminals.

15. A non-transitory computer readable medium comprising a software module stored thereon and including program instructions, the execution of which by a computer processor provides for implementing acts of a method for sharing multimedia content between at least a first user and a second user using a first and a second telecommunications terminal respectively, the multimedia content being associated with the second user and being stored in a database hosted by a service platform accessible via a telecommunications network, wherein the method comprises:

a content sharing server on said network validating a multimedia content sharing request transmitted by the first terminal, by authenticating an identifier of said second terminal obtained from a response to said request, received from the second terminal; and in the content sharing server, if the sharing request is validated, activating a sharing session and opening a sharing memory space intended to enable the sharing of content data between the first and the second terminals, and transmitting session activation information to the first terminal.

* * * * *